United States Patent

[11] 3,603,740

[72] Inventor Ronan Malcolm Cambridge
Ottawa, Ontario, Canada

[21] Appl. No. 850,894
[22] Filed Aug. 18, 1969
[45] Patented Sept. 7, 1971

[73] Assignee Northern Electric Company Limited
Montreal, Quebec, Canada

[54] METHOD AND MEANS FOR RINGING A TELEPHONE SUBSET
6 Claims, 4 Drawing Figs.

[52] U.S. Cl. .......... 179/84 UF, 179/84 T
[51] Int. Cl. .......... H04m 1/26, H04m 1/50
[50] Field of Search .......... 330/109; 179/84 A, 84 UF

[56] References Cited

UNITED STATES PATENTS

| | | | |
|---|---|---|---|
| 2,987,678 | 6/1961 | Miller et al. .......... | 330/109 |
| 3,124,759 | 3/1964 | Dahlberg .......... | 330/109 |
| 3,210,479 | 10/1965 | Engelschall .......... | 179/84 UF |
| 3,270,144 | 8/1966 | Vogel et al. .......... | 179/84 UF |
| 3,471,651 | 10/1969 | Saia et al. .......... | 179/84 A |

*Primary Examiner*—Kathleen H. Claffy
*Assistant Examiner*—William A. Helvestine
*Attorney*—Westell & Hanley

ABSTRACT: A gate in the power circuit to the ringing device of a telephone subset is connected to the line from central office and is designed to be opened by signals within a predetermined frequency range appearing on said line.

RONAN M. CAMBRIDGE
*Inventor* by: Westell & Hanley

RONAN M. CAMBRIDGE
*Inventor* by: Westell & Harley

RONAN M. CAMBRIDGE
*Inventor* by: Westell + Hanley

METHOD AND MEANS FOR RINGING A TELEPHONE SUBSET

This invention relates to a system, an apparatus and a method for causing the emission of an audible tone when a subset is being rung. A "sub-set" is the conventional telephone set owned by a subscriber (or equivalent) and "central office" is the telephone office to which a plurality of subsets are connected.

At the present time, a subscriber's set is equipped with means for causing the set to ring whenever ringing power is applied to the line from central office to the subscriber's set. (The term "line" is used regardless of whether one or two wires connect the subset to central office). The ringing power is customarily sent from the office as 20 Hz., which performs the ringing function, while direct current power exists on the line at all times to provide power for the subscriber's subset for initiation of calls by the latter. One problem is that the 20-Hz. ringing power cannot be handled by new and coming switching systems. An alternative would be to use DC power for the ringing but this is not feasible with the ringing device connected directly to the line, since the DC power which would be used for ringing must be left on the line to provide power for the initiation of calls by the subscriber.

In accord with the invention, a gate located between the telephone office line and the subset normally prevents the application to the ringing device of ringing power originating on the line from the telephone office. A circuit having a predetermined frequency band-pass range is also connected to the central office line and means are provided, responsive to the presence on the central office line, of a signal of frequency in said band-pass range, to provide a signal to remove the inhibit on the gate, whereby the ringing power from the line may be applied to the audible tone producer. In most situations therefore, the center office power is applied to the line at all times effecting ringing only when said band-pass range signal is also applied. In other situations the ringing power will be applied simultaneously with the band-pass range signal. Means are preferably provided to prevent the ringing of a subset when its hand set is off-hook. The frequency of the ringing power will of course, be different from that of the signal used to "open" the gate. The ringing power conventionally has been 20 Hz. but may be direct current on certain applications. The phase "predetermined frequency" in the disclosure and claims herein is (in relation to the ringing power) intended, therefore, to include DC e.g. zero frequency. Thus the ringing power, gated by the gating signal of predetermined frequency, may be DC, avoiding the switching problems caused by 20 Hz. (or similar signals) or may be an alternating signal such as 20 Hz. where the previously discussed switching problems are not encountered. Which ringing power is used will depend on other telephone equipment and design extraneous to this application. Where an AC-ringing signal is provided, it will of course be of different frequency from the gate keying signal, so that any necessary filtering may be used to segregate these signals to perform their proper functions. Ringing power may be left on the line when not used for ringing.

The use of gating signals of selected frequency to connect the ringing power to the audible frequency producer, allows the provision of different gating frequencies for different subsets. Thus, in addition to obvious flexibilities introduced by this possibility, the system allows selective ringing of subscribers on multiparty lines with much simpler apparatus and switching than is now possible.

The gating equipment and its frequency selective control will always be electrically connected in the line and to the line, respectively between the central office and the subset, and will usually by physically located near or as part of the subset. However it is within the scope of the invention to have the gating equipment and its frequency selective control, electrically connected as aforesaid, physically located at the central office.

A preferred aspect of the invention concerns the use, as the frequency selective control element for the gating frequency, of an attenuated phase shift oscillator using a phase shifting R-C network in the feedback circuit. A phase shifting R-C network is of great value in a circuit of this type since it lends itself to the use of integrated and micro circuitry.

It is also a preferred form of the invention, as described in the preceding paragraph, to use a phase shifting R-C network of the twin-T notch-filter-type which has been found suitable for the purpose and for design adaptability to various frequencies. Amplifiers using R-C twin-T notch-filter feedback are already present in telephone subsets of the "touch-tone" variety where they are used as oscillators to produce tone signals on the initiation of a call by the subscriber. Since such calls are initiated with the hand set "off-hook" and the ringing operation performed with the hand set "on-hook," it will be obvious that the hook switch operation may be used to cause switches to convert one of the "touch-tone" oscillators already in the set into a band-pass filter by adding attenuation, and with or without a change of frequency selection to control the gating of ringing power. However it is believed preferable in most cases, if a separate oscillator with R-C feedback is used as the frequency selective gating element.

In drawings which illustrate a preferred embodiment of the invention.

Figure 1:
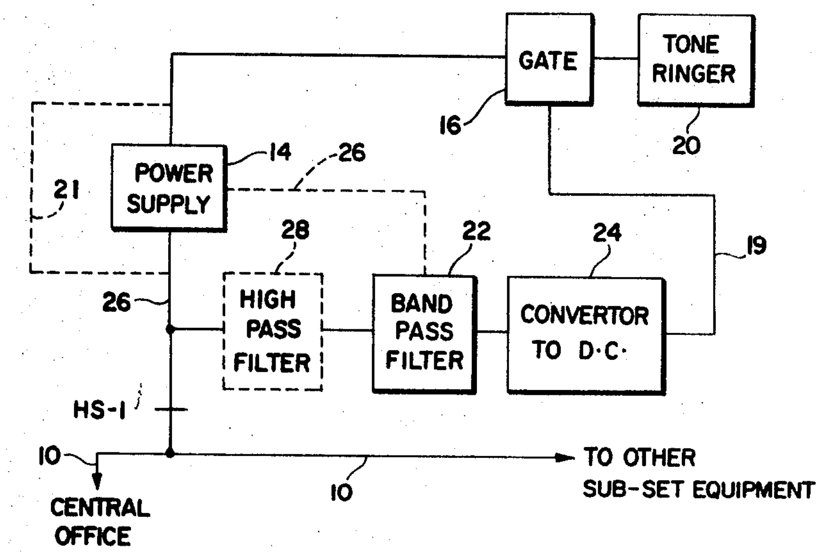
FIG. 1 shows the schematic relationship of the main elements.

In FIG. 1, the invention is shown schematically where lines 10 are the lines from central office to the subset and the blocks shown will structurally form part of the subset but the other subset equipment (i.e. receiver, transmitter, dialling equipment are not shown, since these are well known to those skilled in the art and form no part of the present invention.

In the drawings lines 10 are connected through contacts HS-1, to power supply 14 and gate 16 to a tone-ringer 20. The power supply 14 will be in accord with one of the designs well known to those skilled in the art and is provided to convert the ringing power from central office to a form of power satisfactory to operate the particular tone ringer 20 used. The power supplied by central office may be in the form necessary to actuate the ringer, and if so, the line from central office to gate 16 may bypass power supply 14 (i.e. following dotted lines 21). The power supply will however be required for other purposes. The contacts HS-1 are operated by the hook switch of the subset and are closed when the hook switch is at rest but opened when the hook switch is removed. The ringer may be DC or AC actuated, in either case in accord with techniques well known to those skilled in the art, and the power supplied by Central office along line 10 will be in accord with the equipment used and the design of the tone ringer. Most commonly such power will be DC or 20 Hz. The gate 16 will be designed so that in the absence of a control signal on control lines 19, to prevent the application of power from central office to the toner ringer 20. Power from the power supply is also supplied where required to band-pass filter 22 along line 26. The ringing power for tone ringer 20 will be maintained continuously on the line if desired or if also used for the other subset equipment or will be applied by the central office when ringing at the substation is desired. In either event, central office will provide, at the time that ringing is required, a tone within the band-pass range of filter 22 and the output of filter 22 will provide an output signal of sufficient strength for conversion by converter 24 to the form of control signal required to remove the inhibit from gate 16, in other words to "open" the gate to the passage of ringing power.

The frequency response of filter 22 will be such as to provide an insufficient signal through converter 24 to cause the opening of gate 16 when the frequency supplied thereto is outside the filter band-pass range. Where AC ringing is used or DC power it may be necessary to provide means for protecting the band-pass filter from power other than the gating signal. Where protection is required there may be provided high pass filter 28 between the connection between HS-1 and power supply 14 on the one hand and band-pass filter 22. The power supply may, in certain circumstances, be required to power the band-pass filter and, if so, these connections are shown. The converter 24 is merely inserted to indicate equipment necessary to shape or convert the signal emitted from band-pass filter 22 to the form of signal required to control gate 16. Relay contact HS-1 indicates a contact (or plurality of contacts) closed when the hand set is on the cradle to allow operation of the circuitry disclosed to allow ringing of the subscriber's set, and open when the hand set is off the cradle, to prevent the ringing of the subscriber when the subset is in use. It will be noted that contacts HS-1 would be equally useful for this purpose if inserted in the line between the power supply and gate, or between the gate and tone ringer, or in fact in any other location where they will prevent the operation of the circuit when the receiver is off hook. It is possible although not probable, that in some specialized operation it might be desirable to have the subset rung even when off hook. In this event the hook-switch cutoff for the alarm would be omitted.

Figure 2:
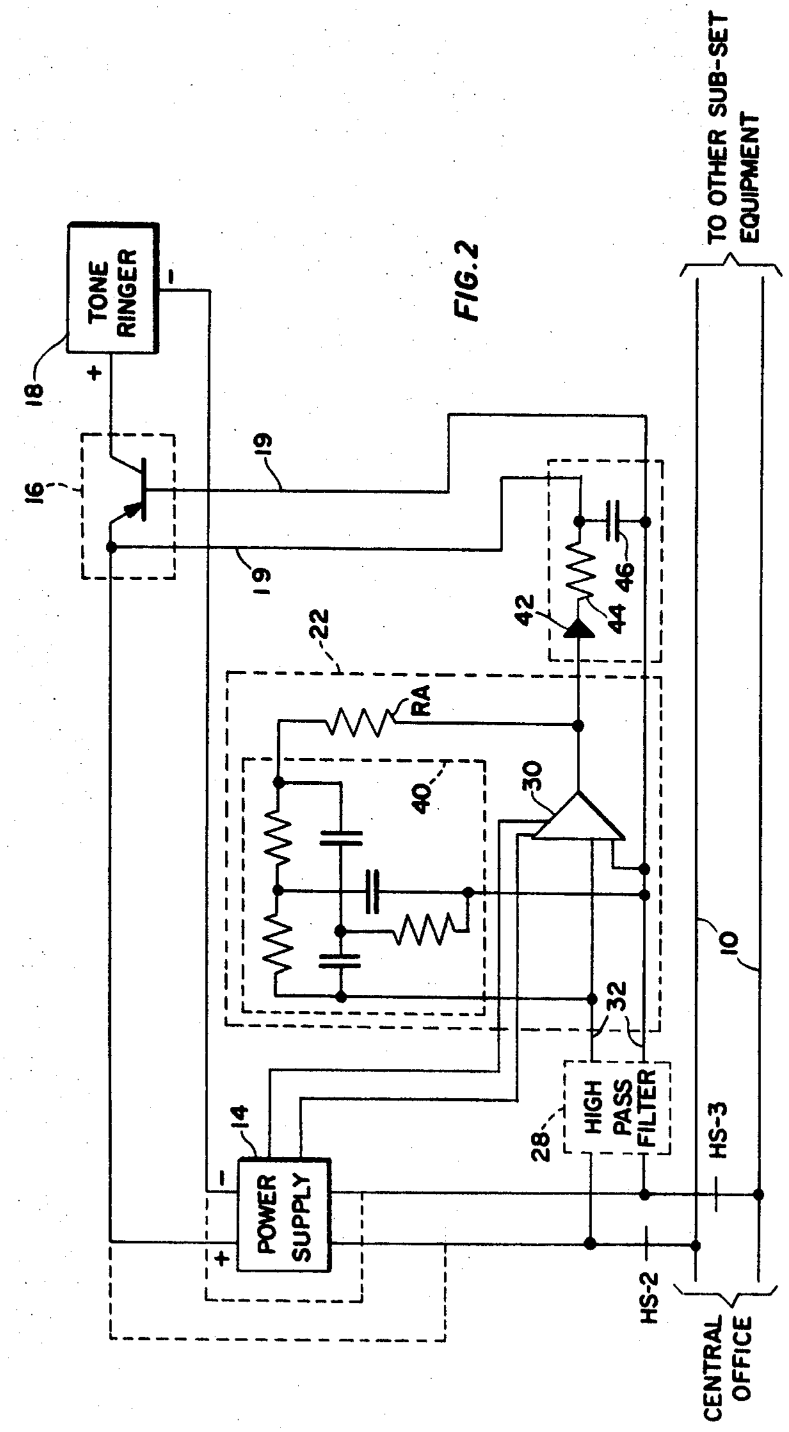
FIG. 2 shows an embodiment of the circuit of FIG. 1.

In FIG. 2 is shown one embodiment of the schematic circuit of FIG. 1.

In FIG. 2 the lines 10 from central office are still connected to the other subset equipment and through contacts HS-2 and HS-3 to the power supply 14, HS-2 and HS-3 being closed and open respectively when the hand set is on and off the hook. The positive output of the power supply, in form suitable for the tone ringer, is provided through the gate 16 to the tone ringer, and the negative output from the power supply is connected directly to the tone ringer.

The gate 16 comprises a PNP transistor switch having its emitter connected to the positive output from the power supply and its collector connected to the positive input for the tone ringer. The negative connection from the power supply 14 to the tone ringer 18 is direct. The gating control signal appearing as hereinafter described on line 19 will be applied between the emitter and base of transistor 16 to cause the latter to conduct, and in the absence of such bias it will be seen that no power is applied to the tone ringer 18 since transistor 16 does not conduct.

It will be appreciated that with a suitable reversal of biases and polarities, in accord with techniques well known to those skilled in the art, an NPN transistor may be used in switch 16 instead of the PNP transistor shown.

The central office lines 10 are connected to the input of the band-pass filter 22 through HS-2 and HS-3. In the event that the operational amplifier requires protection from 20 Hz. ringing current on the main line, a high pass filter 28 is interposed between the filter 22 and its connection to the central office line. This is designed to pass the gating signal frequency but to prevent the application of 20 Hz. or direct current to filter 22.

The band-pass filter 22 uses an operational amplifier 30 connected to receive at its input terminals the signal appearing across lines 32. The operational amplifier 30 is well known and will not be described herein but is described at many places in the literature including "Introduction to Transistor Circuits" by E.H. Cooke-Yarborough 2nd Edition, published by Interscience Publishers Inc. of New York. The operational amplifier 30 is provided with a feedback circuit comprising a phase-shifting RC network 40 which, except for attenuating resistance RA connected in series in the feedback circuit, is similar to a phase-shifting feedback for a phase-shift oscillator using such an amplifier the feedback circuit providing feedback which reinforces the oscillator input over a selective frequency range but which detracts from the oscillator inputs in amounts steadily increasing outside said range. Although any suitable type of RC phase shifting network may be used for the feedback circuit, compatible with the phase shift produced in the amplifier itself, there is here shown a twin-T notch-filter circuit 40 of well-known design. Having a low impedance across the tuned frequency range, and which complements the 180° phase-shift in the operational amplifier with 180°phase-shift in the notch filter over the selected frequency range, but does not properly of sufficiently complement it outside this range. As is well known, the frequency and bandwidth of the twin-T notch-filter is customarily varied and in this case adjusted, by adjustment of the resistor in one of the arms of the T-crossbar. In the preferred embodiment the amplifier with twin-T notch-filter circuit would act as an oscillator within the filter band pass range in the absence of the resistor RA. The resistor RA placed in series with the twin-T notch-filter in the feedback circuit and is selected to supply sufficient attenuation to prevent oscillation or to reduce the overall gain of amplifier and feedback circuit. Since the overall gain of the amplifier, RC phase-shifting circuit and resistor RA are less than one, they, together, act as a band-pass filter to provide an effective output signal only in response to input signals within the frequency band pass range of the filter. It is noted that the addition of the resistance RA may alter the frequency characteristics of the overall feedback network but that this may, if necessary be compensated for by adjustment of the twin-T notch resistance capacitance values. In order to use the output of the filter 22 as an actuator for the transistor switch the input of the amplifier is rectified at diode 42 and integrated at the integrator comprising the series resistance 44 and the parallel condenser 46 and the positive output of the integrator is applied to the emitter of the PNP transistor comprising the gate 16 and the negative integrator output to the base thereof, and thus the value of the output of the operation amplifier may be selected and the necessary constants provided to assure that at the selected bandwidth of the twin-T notch-filter, the transistor switch will be turned on, and at frequencies outside this bandwidth, the switch will be turned off.

In operation therefore, with the handset on the hook, contacts HS-2 and HS-3 will be closed, connecting the power supply 14 to the central office lines which will, in accord with the preferred form of the invention, have the ringing power constantly thereon which ringing power cannot however be applied to the tone ringer 18 because the gate composed by transistor switch 16 is open since no gating tone is provided on the central office lines and hence no signal appears on line 18. When in response to a desire to ring the subscriber, the correct gating tone is provided, a signal of the necessary strength appears at the output of filter 22 and is rectified and integrated by elements 42, 46 and 44 to turn on transistor switch 16 and allow the passage of power from power supply 14 through switch 16 to actuate the tone ringer 18. The ring of the tone will, of course alert the subscriber and the tone will be removed when the receiver is lifted through the opening of switch HS-2 and HS-3.

If an attempt is made by central office to ring a subset which is already in use by applying a gating frequency to lines 10 this will not in fact take place because with the handset removed since HS-2 and HS-3 will be open, deactivating the power supply 14, the filter 22 and the tone ringer. It will be appreciated that in some cases, the ringing power from central office may be suited for direct application to the tone ringer in which case the power supply may be omitted and lines 10 connected directly to gate 16, and in some cases, the gate for the tone ringer may be differently designed. However it will readily be appreciated that for any form of power used to actuate the tone ringer that a gate in one of the designs well known to those skilled in the art, may be provided.

It will further be noted that as far as the embodiment in FIG. 1 is concerned therefore, that it is irrelevant to the proper operation of the invention whether AC or DC ringing power is used and whether this is left on the line but only effective to operate a specified tone ringer when the proper gating tone is applied to the line, or whether the ringing power is not always on the line and is applied along with the gating power.

Figure 3:
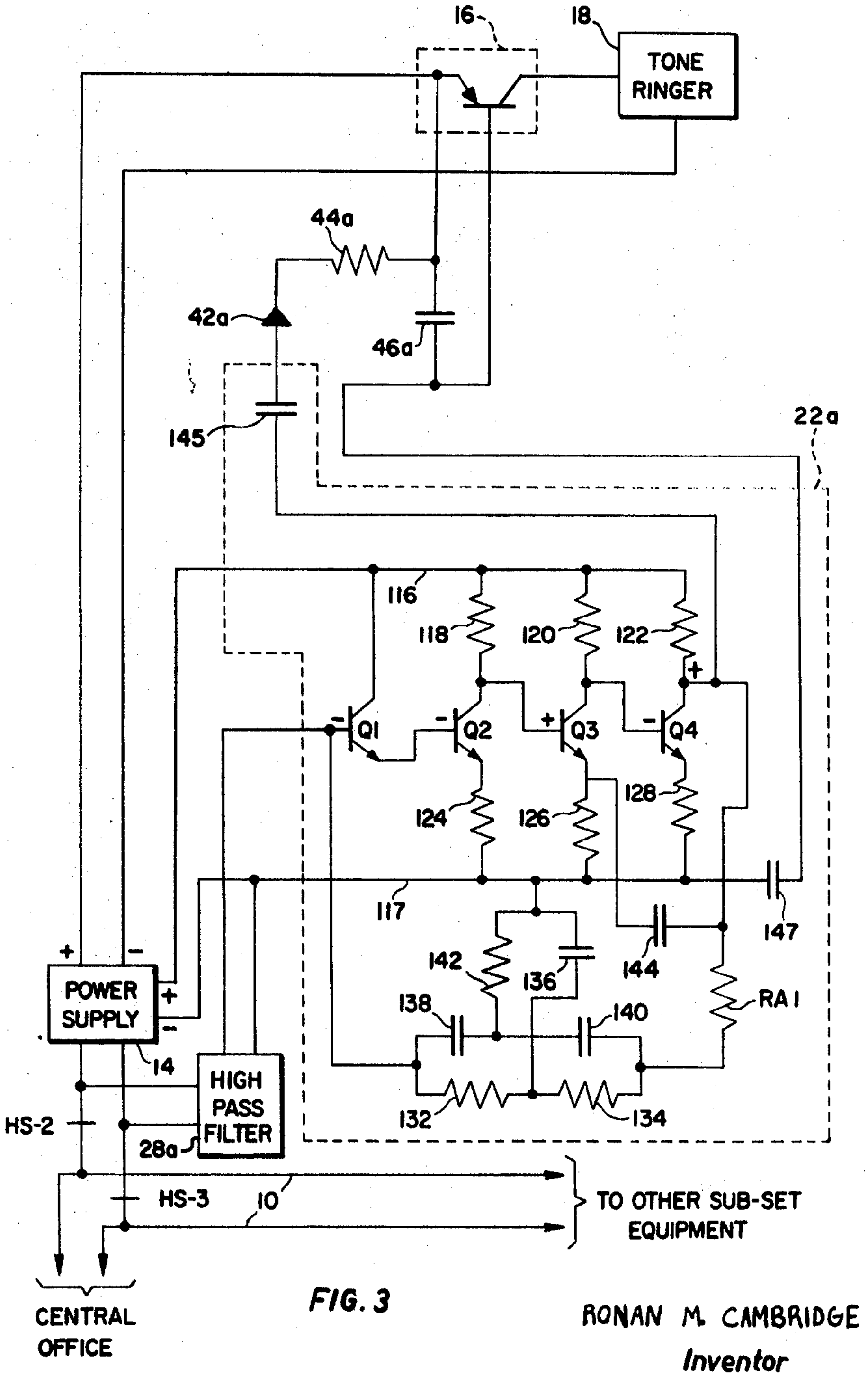
FIG. 3 shows an embodiment of the invention using a twin-T notch filter.

In FIG. 3 the arrangement is similar to that shown in FIG. 2 with the central office line connected to the other subset equipment and also through contacts HS-2, HS-3 (closed when the hook switch is at rest) to power supply 14. The plus side of the power supply is connected to the emitter of a PNP transistor whose collector is connected to the tone ringer and the negative side of the power supply is connected directly to the tone ringer. The central office equipment lines are as in FIG. 2 connected through a high pass filter 28A (if necessary) to the band-pass filter 22A comprising an attenuated RC phase-locked oscillator and from the output of this through a rectifier 42A and an integrator comprising series resistor 44A and shunt condenser 46A to the emitter-base terminals, respectively, for the transistor comprising gate 16. However, in this view, the oscillator shown is of the type used at present for "touch-tone" signalling. Since the drawing is shown in some detail, the power supply connections from the power supply 14 are shown (positive to a line 116 and negative to a line 117). As indicated in the drawing, the RC oscillator is used formed the NPN transistors Q1, Q2, Q3 and Q4 with the feedback circuit from the collector of transistor Q4 being connected through a twin-T notch filter to the base of Q1 and in series therewith through a resistor RA1 to form a twin-T oscillator modified by resistance RA1 in the feedback line which will probably be considered as well known and self-evident. It will be noted that to act as an oscillator, the resistance RA1 would be omitted and the resistance RA1 is chosen so that the device will not not act as an oscillator but rather as a band-pass filter for the chosen gating frequency. It will further be noted that selection of the frequency band-pass is customarily performed by treating all the elements in the twin-T notch filter as fixed except one of the resistances 132 or 134 which are altered to suit the frequency chosen. In FIG. 3 line 116 is connected to the collector of Q1, to the collector Q2 through a resistance 118, to the collector of Q3 through a resistance 120, and to the collector of Q3 through a resistance 122. The line 117 is connected through a resistance 124 to the emitter of transistor Q2, through a resistance 126 to the emitter of transistor Q3 and through a resistance 128 to the emitter of transistor Q4. The collector of Q4 is connected to the positive terminal of diode 42A through condenser 145 and the line 117 is connected through condenser 147 to the base of the transistor 16 and to one terminal of condenser 46A. The collector of transistor Q4 is connected to form the main feedback line through resistance RA1 to a twin-T notch-filter comprising:

in one "T" resistances 132 and 134 in series between RA1 and Q1 base with the junction between resistances 132 and 134 connected to line 117 through condenser 136. And the other T which is in parallel with the first, condensers 138 and 140 are connected in series between RA1 and the base of Q1 and the junction between the condensers is connected to line 117 through a resistance 142. The collector of Q4 is also connected through a condenser 144 to the emitter of transistor Q3. The emitter of transistor Q1 is connected to the base of transistor Q2, the collector of transistor Q2 is connected to the base of Q3, and the collector of transistor Q3 is connected to the base of Q4.

Signs at the bases of the transistors for a negative going input at the base of transistor Q1 and at the collector-base connections from Q1 to Q4 and at the output of the notch filter are shown.

As indicated, a negative input to the base of Q1 creates a negative input at the base of Q2 positive at the base of Q3, negative at the base of Q4 and positive at its collector. As is well known, with a twin-T notch-filter, the selection of the resistance and capacitance values in the twin-T notch, determines a frequency or a bandwidth of frequencies of minimum impedance to an alternating signal attempting to pass therethrough, and depending on the selection of these values, the bandwidth may be narrow or broad and will be selected here for relatively narrow bandwidths to act as a filter for the desired frequency to be supplied from the lines 10 through the high pass filter and supplied from the output terminals being the collector of Q4 and the line 117 through condensers 145 and 147 respectively through the rectifier 42A and integrator 44A—46A (as shown) and both the same form as FIG. 2 to control the emitter-base bias of the gate transistor 16. The notch-filter values may be modified to take into account the presence of the resistor RA1.

It will be appreciated (this is of general application) that the selection of an RC oscillator contributes to the manufacture of circuitry by integrated circuit techniques. The condenser 144 connected between the collector of Q4 and the emitter of Q3 supplies negative feedback with the condenser being so selected that this negative feedback shall be of negligible importance at the desired oscillator frequency but will reduce the strength of higher unwanted frequencies in the output with the effect increasing as the frequency increases.

As previously stated, the circuit shown in FIG. 3 is in substance the same as would be used for producing one of the tones of a touch-tone dial except that with the touch tone dial oscillator alternative values for resistance 132 would be provided to allow the selection of the various tones and RA1 would be omitted. The purpose of showing the circuit therefore is to indicate that, where desired, the frequency filter for gating ringing power to control the provision of the ringing signal may be adapted from one of the touch-tone circuits by switching (not shown) controlled by the operation of the hook switch so that the circuit shown forms part of a touch-tone circuit when the handset is off hook and a high frequency filter when the handset is on hook and the device shown is thus not only compatible with the touch-tone signalling system but is also available without an additional oscillator when the touch-tone system is installed. In general, however it is thought that the circuit of FIG. 2 will be preferred.

Figure 4:
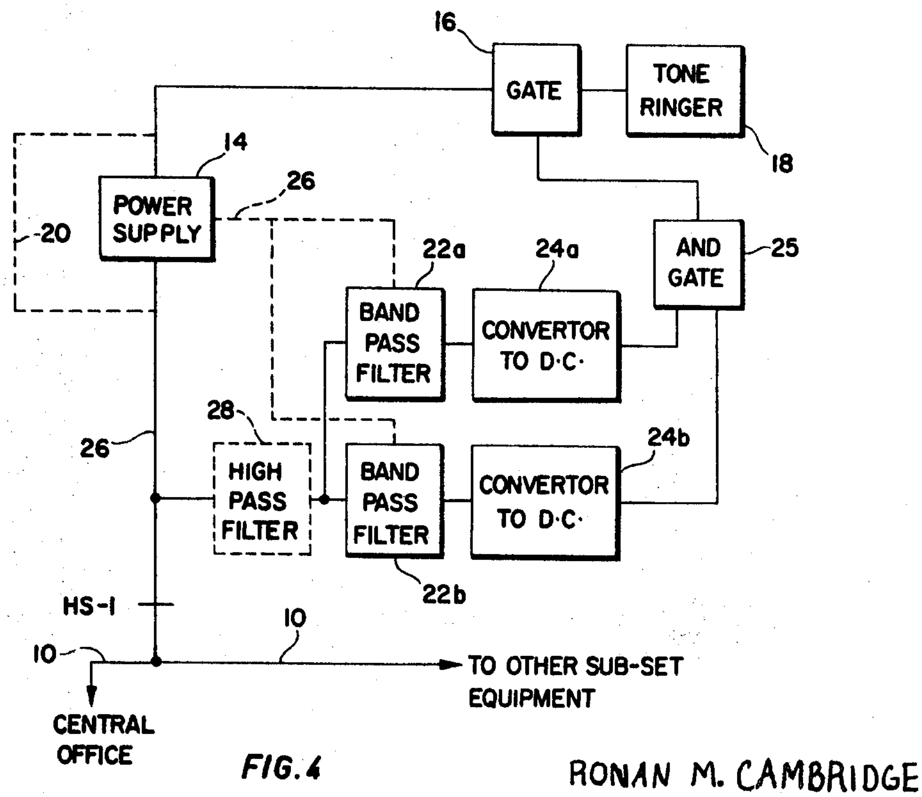
FIG. 4 shows an alternative schematic to that shown in FIG. 1.

In FIG. 4 circuitry is shown whereby the tone ringer of a set may be selectively controlled where two keying tones are required. As indicated, central office line is connected through power supply 14 and a gate 16 to the tone ringer as before, the gate being closed in the absence of a signal from gate 16 which is only actuable when a tone is suitable for each of the band-pass filters 22A and 22B. When this situation occurs both filters supply, through their converters, respective control signals to the and gate 25 and on receipt of contemporaneous signals the and gate is designed to emit a signal suitable to gate 16 and the set may be rung by power from supply 14. It will be appreciated that the number of sets which may be connected for selective ringing in this way is the number of combinations of frequencies taken two at a time.

I claim:

1. A method of controlling ringing in a telephone subset, connected to a telephone office by a line and provided with means for emitting an audible signal on receipt of ringing power originating with said telephone office, comprising the steps of:

maintaining ringing power on the said line;

preventing the application of ringing power to the said audible signal-producing means in the absence on said line of a signal within a predetermined frequency range which range does not include the frequency of said ringing power;

applying to said line during the interval when it is desired to ring said subscriber's subset, in addition to said ringing power, a signal within said predetermined frequency range.

2. Means for controlling the ringing of a subscriber's subset connected to central office by a line, comprising:

means associated with said subset, responsive to ringing power on said line of predetermined frequency to produce an audible tone in the vicinity of said subset, gating means located between said line and said audible tone producing means operable, in the absence of a control signal, to prevent application of ringing power originating with said line to said audible tone producing means a device associated with said subset designed and connected, responsive to the presence on said line of a signal, within a predetermined frequency range not including the frequency of said ringing power to produce said control signal and to supply it to said grating means to cause said gating means to allow ringing power through said gate to said audible tone producing means.

3. A device as claimed in claim 2 wherein said frequency range responsive device comprises an amplifier having its input connected to said line, said amplifier having a frequency selective feedback circuit designed and constructed to cause said amplifier to act as a frequency selective filter, and wherein the output of said amplifier is connected to control the said gating means.

4. The method as claimed in claim 1 including the steps of amplifying signals appearing on said line and feeding back from the output of said amplifier said amplified signals for reamplification, providing frequency selective filtering to said fed back signal to such a manner that the output of said amplifier produces a control signal conditional on the presence on said line of a signal within said predetermined frequency range, and using said control signal to allow the application of ringing power to the said audible signal producing means.

5. The method of selective ringing of subscriber's subsets, wherein said subsets are connected by a line to a central office, wherein said subsets are provided with means for producing an audible signal, on receipt of ringing power of predetermined frequency continuously applying said ringing power to the subscriber's line, normally preventing application of said ringing power to said audible signal-producing means selectively applying to said line, in addition to said ringing power a signal within a predetermined frequency range in response to the presence of said signal of predetermined frequency on said line, permitting the application of said ringing power to said audible signal-producing means.

6. A method of controlling ringing in a telephone subset, connected to a telephone office by a line and provided with means for emitting an audible signal on receipt of ringing power from said telephone office, comprising the steps of:

maintaining ringing power on the said line;

preventing the application of ringing power to the said audible signal-producing means in the absence on said line of at least two simultaneously present signals, each within different predetermined frequency ranges, none of which ranges include the frequency of said ringing power, applying to said line, during the interval when it is desired to ring said subscriber's phone simultaneous signals respectively within said predetermined frequency ranges.